(No Model.)
H. H. CALL & A. A. CLOUGH.
COTTON PICKER.
No. 490,101. Patented Jan. 17, 1893.
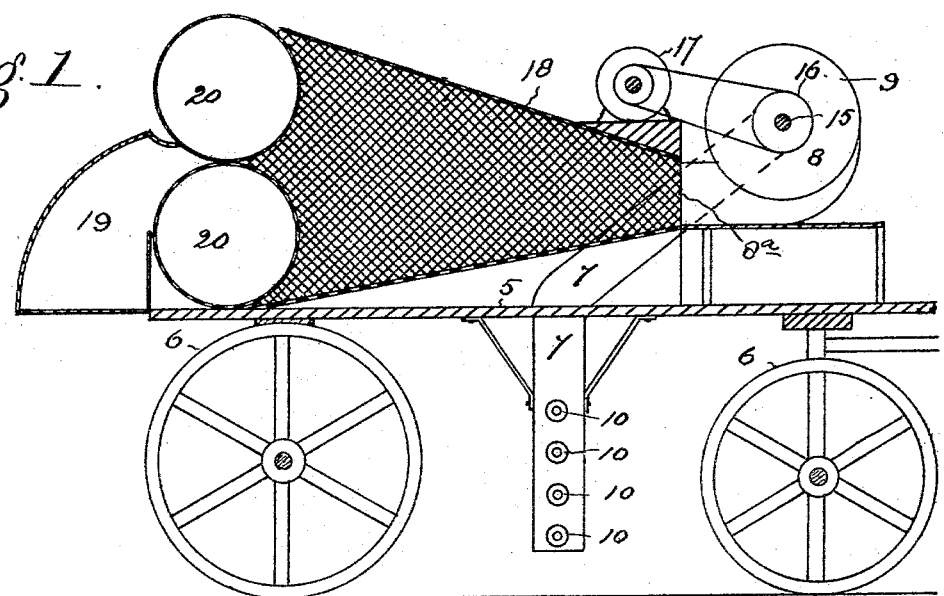
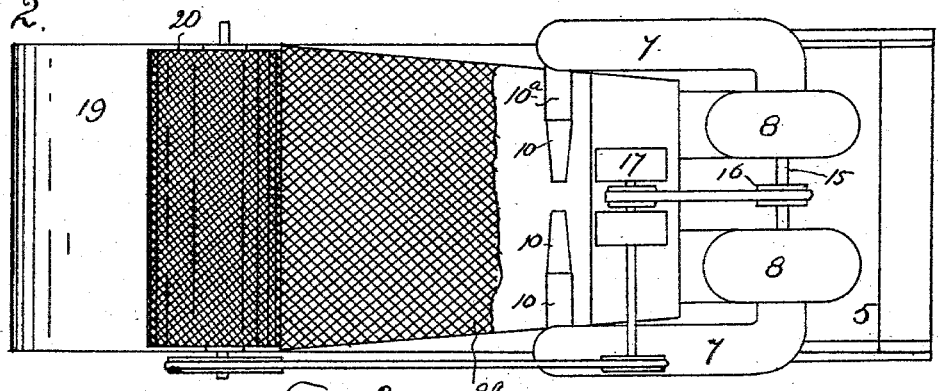
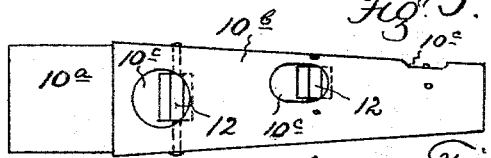
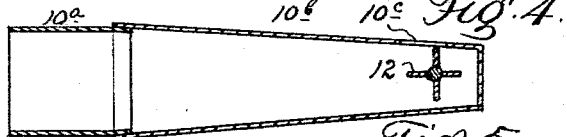
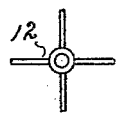
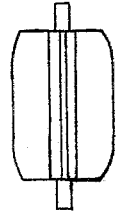
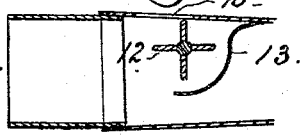
WITNESSES:
INVENTORS
H. H. Call
A. A. Clough
BY
A. J. O'Brien
ATTORNEY.

UNITED STATES PATENT OFFICE.

HARRY H. CALL AND AUGUSTUS A. CLOUGH, OF DENVER, COLORADO.

COTTON-PICKER.

SPECIFICATION forming part of Letters Patent No. 490,101, dated January 17, 1893.

Application filed December 18, 1891. Serial No. 415,540. (No model.)

*To all whom it may concern:*

Be it known that we, HARRY H. CALL and AUGUSTUS A. CLOUGH, citizens of the United States of America, residing at Denver, in the county of Arapahoe and State of Colorado, have invented certain new and useful Improvements in Cotton-Pickers; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in cotton pickers or harvesters and the object of the invention is to provide a machine of this class which while being comparatively simple in construction and economical in cost, shall be reliable, durable and efficient in use.

In our improved machine which is mounted upon a suitable vehicle we employ one or more depending suction pipes or tubes, preferably two, occupying positions on either side of the row of cotton plants as the machine is moved over the field. Secured to these suction tubes in any suitable manner and extending inwardly therefrom so as to engage the plants, are the pickers, consisting of nozzles having openings formed therein of sufficient size to permit the entrance of the staples of the plants and provided with small fans or blades located therein and rotated by the suction therethrough, in proximity to each opening, the function of these fans within the nozzles being to remove the cotton from the plant by direct engagement with the staples which are drawn into the openings in the nozzles by the suction induced in the pipes to which the nozzles are attached. Preferably a series of these nozzles is attached to each suction pipe, one above another in order to engage the entire plant or that portion thereof having staples of ripe cotton thereon. For this reason the nozzles should be removable so that a greater or less number may be employed and those used located so as to act on the portion of the plants upon which the cotton is ripe.

The invention will be fully understood by reference to the accompanying drawings, in which is illustrated an embodiment thereof.

In the drawings, Figure 1 is a longitudinal vertical section taken through the center of the machine showing one of the depending suction tubes in elevation. Fig. 2 is a top or plan view of the machine, the screen walls of the condensing chamber being partially broken away to show the position of the nozzle pickers underneath. Fig. 3 is an elevation on an enlarged scale showing one of the picker nozzles. Fig. 4 is a longitudinal section through the same. Fig. 5 is a fragmentary section of one of the pickers. Figs. 6 and 7 are detail views of the small fans pivoted within the nozzles.

Similar reference characters indicating corresponding parts or elements in the several views, let the numeral 5 designate a suitable frame mounted upon wheels 6. Depending from this frame and suitably supported thereon are the suction tubes 7 communicating at their upper extremities with the exhaust chambers 8. The exhaust mechanism is mounted upon a shaft 15 journaled in the frame and provided with a pulley 16 by means of which motion may be communicated to the shaft from any suitable motor. The fans are so rotated as to cause a suitable suction up through tubes 7. Beneath the platform or body of the vehicle these depending tubes are provided with the picker-nozzles 10 each of which consists of the flexible neck portion $10^a$ and the outer metallic part $10^b$. These nozzles are substantially the same in construction but may be of different sizes or length as may be desired. The metallic portion or shell of the nozzle is provided with any desired number of openings $10^c$ of sufficient size to allow the cotton staples to enter under the influence of the suction induced by the fan mechanism connected with the tubes.

Within the nozzle and in suitable proximity to each opening is located a small rotating fan 12 which should be composed of metal. The spindle of each fan 12 is pivoted or journaled in the wall of the nozzle and so located that the blades of the fan engage the staples of the plant as they enter the openings and remove the cotton therefrom.

As shown in the drawings the outer or free extremity of the nozzle is closed so that the air enters the nozzles only through the openings $10^c$ in the side walls thereof. Each fan 12 of any nozzle, except that farthest from the suction tube, is provided with a shield or protector 13, to prevent the air rushing through the openings in the nozzle farther from the tubes 7, from interfering with the fans 12 which are located nearer said tubes. These shields 13 are secured at one extremity to the inner surface of the nozzle and curve inwardly, partially surrounding the fan 12, forming a complete protection from the passing air currents and the cotton which they carry on their way to the suction tube.

For the purpose of creating the required suction in the tubes 7, motion is communicated to the fan shaft 16 by connecting the pulley 15 with any suitable motor. Motion may be transmitted to this shaft from the running gear of the vehicle by the use of a suitable connection, or an electro-motor 17 run by a storage battery carried on the vehicle may be employed. As the shaft 16 carrying the fans is rotated the air rushes with great velocity through the openings in the nozzle, carrying with it the staples of the plants, the cotton being removed by the blades of the rapidly rotating picker-fans, carried upward through the suction tubes to the fan chambers and thence out through suitable discharge openings 8$^a$ in the rear of said chambers to the condensing chamber or cage 18, the walls of which are composed of screen material of suitable mesh to permit the free escape of the air forced thereinto, but at the same time fine enough to prevent the escape of the cotton which is carried by the air into this chamber.

At the rear extremity of chamber 18 are located two screen rollers 20, one above the other, and in suitable proximity, between which the cotton passes from the condensing chamber and thence into a suitable receptacle 19 in the rear of the rollers and from which it may be removed at will.

From the foregoing description it will be observed that the nozzles having the rotating picker-fans or blades located therein, are the essential and indispensable feature of the invention. The furcated dependent tube provided with laterally projecting nozzles arranged to project into the line of plants, shown and described in this application but not claimed herein, we claim in our application filed July 25, 1892, Serial No. 441,214. Hence

What we claim is:—

1. In a cotton harvester the combination with a suitable vehicle, a screen-receiving chamber having rollers in the rear, exhaust mechanism having discharge openings communicating with said chamber and connected with suction tubes leading downward therefrom, of nozzles flexibly attached to said tubes and provided with rotating picker-blades pivoted therein in proximity to openings formed in the shell of the nozzle for the entrance of the plant-staples, substantially as described.

2. In a cotton picker the combination of a nozzle closed at its outer extremity and having openings in its side walls for the entrance of the plant staples, rotating picker blades located wholly within the nozzles and in proximity to the side openings and interior shields adapted to protect the rotating fans or blades from the air currents entering the nozzles at points farther from the suction pipes, substantially as described.

3. In a cotton picker the combination of a nozzle having rotating picker blades or fans pivoted therein in proximity to openings for the entrance of the plant staples and interior shields adapted to protect the rotating fans or blades from the air currents entering the nozzles at points farther from the suction pipes, substantially as described.

In testimony whereof we affix our signatures in presence of two witnesses.

HARRY H. CALL.
AUGUSTUS A. CLOUGH.

Witnesses:
WM. McCONNELL,
G. J. ROLLANDET.